(12) United States Patent
Labiche (10) Patent No.: US 11,961,224 B2
(45) Date of Patent: *Apr. 16, 2024

(54) DEVICE FOR THE QUALITATIVE EVALUATION OF HUMAN ORGANS

(71) Applicant: STELLA SURGICAL, Le Cres (FR)

(72) Inventor: Clément Labiche, Saint Series (FR)

( * ) Notice: Subject to any disclaimer, the term of this patent is extended or adjusted under 35 U.S.C. 154(b) by 175 days.

This patent is subject to a terminal disclaimer.

(21) Appl. No.: 16/419,563

(22) Filed: May 22, 2019

(65) Prior Publication Data

US 2020/0219249 A1 Jul. 9, 2020

(30) Foreign Application Priority Data

Jan. 4, 2019 (FR) .................................. FR1900066
Mar. 4, 2019 (FR) .................................. FR1902202

(51) Int. Cl.
*G06T 7/00* (2017.01)
(52) U.S. Cl.
CPC .................................. *G06T 7/0012* (2013.01)
(58) Field of Classification Search
CPC ...... G06T 7/0012–7/0016; G06T 2207/10024; G06T 2207/30056; G06T 2207/30092
USPC .......................................................... 382/128
See application file for complete search history.

(56) References Cited

U.S. PATENT DOCUMENTS

| 5,827,176 | A | * | 10/1998 | Tanaka ..................... | A61B 1/05 |
| | | | | | 600/129 |
| 2004/0151379 | A1 | * | 8/2004 | Kim ........................ | A61B 5/416 |
| | | | | | 382/209 |

| 2006/0159325 | A1 | 7/2006 | Zeineh et al. |
| 2009/0262993 | A1 | 10/2009 | Kotsianti et al. |

(Continued)

FOREIGN PATENT DOCUMENTS

WO 2017/161097 A1 9/2017

OTHER PUBLICATIONS

Moccia, Sara, Leonardo S. Mattos, Ilaria Patrini, Michela Ruperti, Nicolas Poté, Federica Dondero, François Cauchy et al. "Computer-assisted liver graft steatosis assessment via learning-based texture analysis." International Journal of Computer Assisted Radiology and Surgery 13 (2018): 1357-1367. (Year: 2018).*

(Continued)

*Primary Examiner* — Edward F Urban
*Assistant Examiner* — Wassim Mahrouka
(74) *Attorney, Agent, or Firm* — Patshegen IP; Moshe Pinchas (57) ABSTRACT

The system for the qualitative evaluation of human organs includes: a camera (101) for capturing an image of the organ, the organ being in the donor's body or already collected or placed in a hypothermic, normothermic and/or subnormothermic graft infusion machine at the time of image capture; an image processor (103, 104) configured to extract at least a portion of the organ image from the captured image and an estimator (103, 104) for estimating, from the extracted image, the health of the organ. In some embodiments, the device also includes a means of introducing into the donor's body at least one optical window of the image capture means as well as a light source to illuminate the donor's organ, while maintaining the sterility of the surgical field. In some embodiments, the image processor involves applying a clipping mask to the captured image.

9 Claims, 8 Drawing Sheets

(56) References Cited

U.S. PATENT DOCUMENTS

| | | | |
|---|---|---|---|
| 2011/0267483 A1* | 11/2011 | Kanamori | H04N 5/2256 |
| | | | 348/220.1 |
| 2012/0093390 A1 | 4/2012 | Wiemker et al. | |
| 2012/0177260 A1* | 7/2012 | Su | A61B 6/5217 |
| | | | 382/128 |
| 2014/0303435 A1* | 10/2014 | Taniguchi | A61B 1/00006 |
| | | | 600/103 |
| 2017/0140446 A1* | 5/2017 | Melcher | G06K 9/6215 |
| 2018/0263568 A1* | 9/2018 | Yi | A61B 1/00172 |
| 2018/0279866 A1* | 10/2018 | Makino | A61B 1/05 |
| 2018/0350071 A1* | 12/2018 | Purwar | G06V 40/10 |
| 2019/0014884 A1* | 1/2019 | Fu | G06K 9/00281 |
| 2019/0282307 A1* | 9/2019 | Azizian | A61B 34/20 |

OTHER PUBLICATIONS

Rey, J. W., et al. "Hepatic steatosis in organ donors: disparity between surgery and histology?." Transplantation proceedings. vol. 41. No. 6. Elsevier, 2009. (Year: 2009).*

IEEE Engineering IH Medicine and Biology; Assessing Liver Tissue Fibrosis With an Automatic Computer Morphometry System; May/Jun. 1997.

* cited by examiner

DEVICE FOR THE QUALITATIVE EVALUATION OF HUMAN ORGANS

This invention concerns a device for the qualitative evaluation of human organs, particularly the liver and/or the pancreas. It concerns, in particular, the field of human liver transplants and the treatment of obesity.

STATE OF THE ART

When attempts are made to transplant liver between humans, the donor's liver may have qualitative alterations that may compromise the recipient's life. In particular, a steatosis rate above a certain limit value, for example 50%, is generally considered incompatible with transplantation. A steatosis rate below this limit value but above a second limit value, for example 35%, requires preliminary degreasing before transplantation.

However, obtaining biological data and making decisions, generally taken by the surgeon in charge of the implant, impose delays and expenses, particularly travel expenses, which hinder the proper progress of the transplantation. In addition, visual estimation is unreliable and the conduct of biological analyses imposes delays that are detrimental to liver quality.

A rapid and accurate assessment of hepatic steatosis (HS) by transplantation is of primary importance to reduce the risk of liver dysfunction after transplantation. Histopathological analysis of the biopsied liver is the reference examination for assessing HS, even if it is invasive, time-consuming and requires tools that are not always available. Because of the short time between liver harvesting and transplantation, surgeons evaluate HS by clinical evaluation (medical history, blood tests) and visual analysis of liver texture. Although visual analysis is recognized as a challenge in the clinical literature, little effort has been invested in developing computer-assisted solutions for the evaluation of HS.

With regard to the treatment of obesity, there are no means of giving an immediate diagnosis, including a steatosis rate.

SUMMARY OF THE INVENTION

The purpose of this invention is to make a method of qualitative evaluation of human livers portable and accessible and to remedy all or part of these disadvantages. To this end, the present invention concerns a system for the qualitative evaluation of human organs, which comprises:
- a means of capturing an image of the organ, the organ being in the donor's body or already collected or placed in a hypothermic, normothermic and/or subnormothermic graft infusion machine at the time of image capture;
- image processing means configured to extract at least a portion of the organ image from the captured image and
- a means of estimating, from the extracted image, the health of the organ.

Thanks to these provisions, before sampling or transplanting the organ, it is automatically estimated whether the organ is healthy enough for the transplant to be beneficial to the recipient. Similarly, for the treatment of obesity, an objective estimate of the patient's organ steatosis rate is immediately available.

In particular embodiments, the device also includes a means of introducing into the donor's body at least one optical window of the image capture means as well as a light source to illuminate the donor's organ, while maintaining the sterility of the surgical field.

In particular embodiments, the image processing means involves applying a clipping mask to the captured image.

In particular embodiments, the processing means includes a means of generating the trimming mask, by processing the colors and/or contours in the captured image.

In particular embodiments, the processing means is configured to detect at least one reflection on the surface of the organ in the captured image and to extract at least one area with such reflection from the image.

In particular embodiments, the means of estimation of organ health includes a means of realization of a color histogram and a means of comparison of at least one color of this histogram with a standardized color.

In particular embodiments, each standardized color is carried by a color chart introduced in the field of the captured image.

In particular embodiments, the organ health estimation means includes a means of performing texture sampling and a means of comparing at least one texture with a reference texture.

In particular embodiments, the means of capturing an image is a mobile phone.

In particular embodiments, the image capture means includes a flash light source and is configured to capture an image with the light source triggered.

In particular embodiments, the device further comprises a sterile cover configured to contain the image capture means and including a transparent and rigid image capture window to be positioned in front of the objective of the image capture means.

In particular embodiments, the sterile cover includes a polarizing filter to be positioned opposite a light source and a polarizing filter to be positioned opposite the objective of the image capturing means.

In particular embodiments, the organ is a liver or a pancreas.

BRIEF DESCRIPTION OF THE DRAWINGS

Other advantages, purposes and characteristics of the present invention will emerge from the description that follows, for explanatory purposes and in no way limiting with regard to the annexed drawings, in which.

DESCRIPTION D'EXEMPLES DE RÉALISATION DE L'INVENTION

Hepatic steatosis (HS) is one of the most important donor characteristic that can influence graft function and so LT out-come, mostly because of severe ischemia reperfusion injury. Defined as the intracellular accumulation of triglycerides resulting in the formation of lipid vesicles in the hepatocytes, HS is commonly assessed by histopathological examination of liver tissue samples extracted with biopsy. Through visually analyzing the quantities of large sized lipid droplets in the sample, an HS score is assigned to the sample in a semiquantitave fashion. Livers classified as with 5-30% fatty infiltration are associated with decreased patient and graft survival, but are still considered suitable for transplantation due to the limited donor availability. Severe HS (≥60%) is instead associated with primary graft dysfunction or non-function and is not compatible with transplantation.

Figure 1:
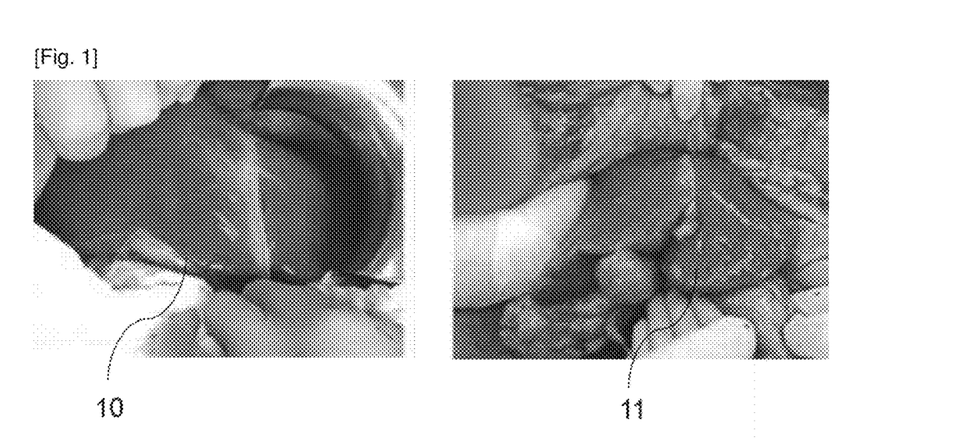
FIG. 1 shows samples of RGB images of the liver taken in the operating room.

Despite histopathological analysis of biopsied liver tissue being currently the gold reference standard for diagnosis and grading of HS in liver grafts, it is invasive, time-consuming, and expensive. Due to the short time availability between liver procurement and transplantation, the surgeon usually performs HS assessment through clinical evaluation (medical history, blood tests) and qualitative visual graft assessment. In this context, visual liver texture analysis is recognized as crucial in grading HS: livers that cannot be transplanted due to high HS (FIG. 1, right) are usually characterized by inhomogeneous texture and are more yellowish than the transplantable ones (FIG. 1, left). It is nonetheless recognized that the precise estimation of HS remains challenging even in experienced hands.

On this background, the development of a robust, quantitative, practical, cost-effective and rapid method to support the surgeon in deciding whether to accept or discard liver grafts is mandatory. Considering challenges in diagnosis, preliminary efforts to the automated or semiautomated HS assessment have been proposed and a complete review can be found in. Examples include, which reported a sensitivity (Se) of 79% in recognizing the HS level from computer-tomography (CT) images, and which reported an area under the receiving operating characteristic curve of 75% by exploiting fibroscanning. Liver-bioelectrical-impedance analysis and Raman spectroscopy were used in, respectively. A semiautomatic HS-grading approach that exploits magnetic resonance (MR) spectroscopy has been proposed in, achieving a Spearman correlation coefficient of 0.90.

It is worth noting that all the proposed methodologies require additional imaging instrumentation, which may be not always available in the remote graft procurement hospitals. Moreover, at most the methods concluded that there is a correlation between liver physical characteristics (e.g., liver stiffness and impedance) and HS grade, without providing a solution for liver graft quality assessment.

In the description that follows, the term "liver" is used and can be replaced by the word "pancreas".

FIG. 1 shows two samples of RGB images (acronym for Red-Green-Blue, each color being formed from these three fundamental components) of the liver taken in the operating room. Images are captured with different lighting conditions and different tissue-camera pose. Images refer to a transplanted-liver graft (left) and a discarded one (right).

Figure 2:
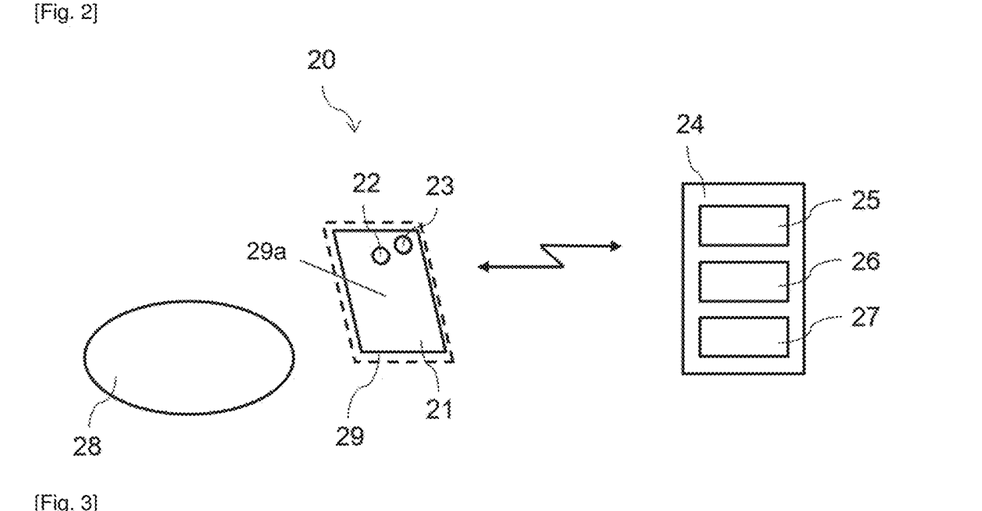
FIG. 2 represents, schematically, a first embodiments of an evaluation device object of the invention.

In general, the present invention concerns a device 20 for the qualitative evaluation of human livers, which includes, as illustrated in FIG. 2:

a means 21 for capturing an image of a human liver 28, the liver being in the donor's body or already collected or placed in a hypothermic, normothermic and/or subnormothermic graft perfusion machine at the time of image capture;

an image processing means configured to extract at least a portion of the liver image from the captured image and a means of estimating, from the extracted image, the health of the liver.

Figure 3:
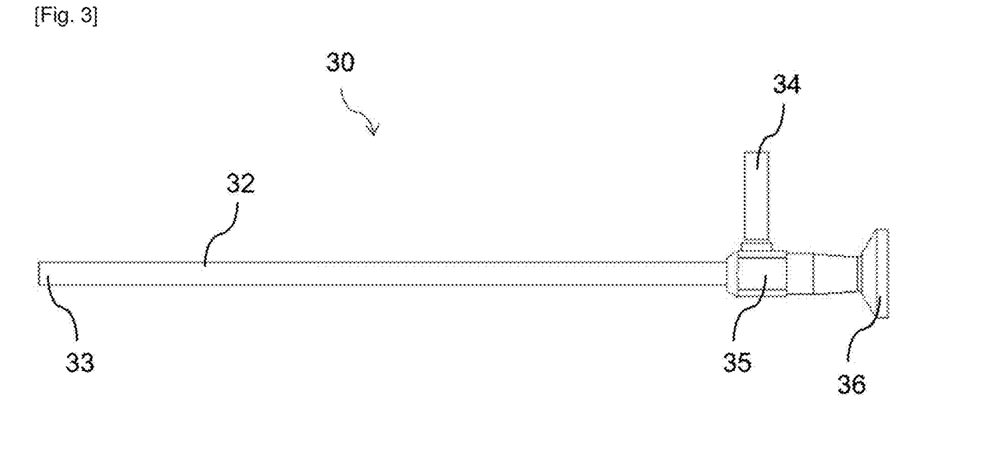
FIG. 3 represents, schematically, an accessory of embodiments of devices subject to the invention.
Figure 11:
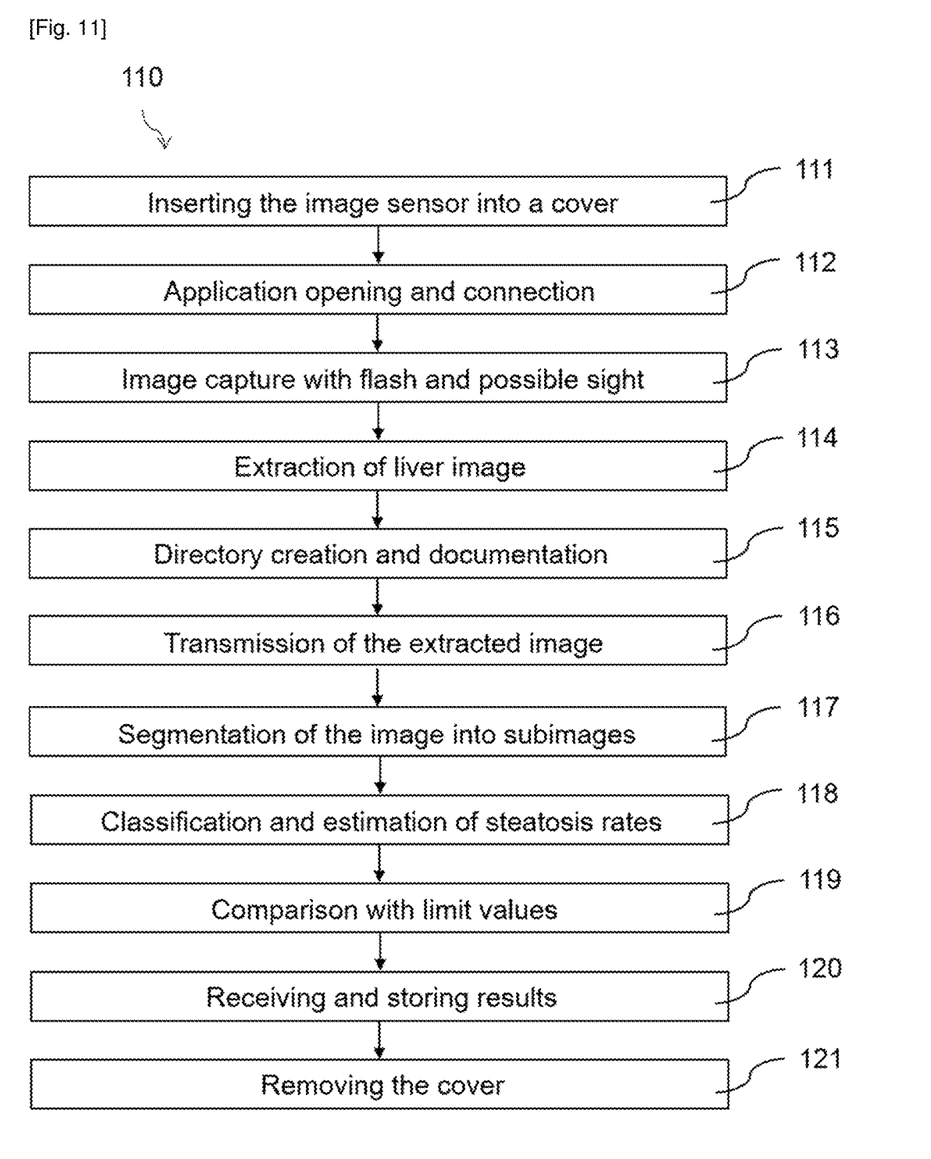
FIG. 11 represents, in the form of a flowchart, steps of extracting an image from a liver into a captured image.

According to embodiments, the liver whose quality is assessed is:

in the donors body whose abdominal organs are visible after incision of the skin, as shown in FIG. 11;

in the donor's body, the liver being observed by means of an endoscope 30 illustrated in FIG. 3, inserted into a trocar, the donors abdomen being inflated to perform laparoscopy where already extracted from the donors body and possibly in a graft perfusion machine.

In the embodiment illustrated in FIG. 2, the image capturing means is a digital camera or, preferably, a smartphone. This image capturing means, equipped with an optical window 22 on the front lens of its lens and a flash light source 23, is preferably inserted into a sterile protective cover 29.

The materials used for the cover can be polyethylene or polyurethane or silicone with maintained tactile properties. Antibacterial and fungistatic agents may be applied to the surface of the cover. The cover is closed by adhesive (folding system on one side of the cover and gluing). The cover is compatible with all smartphones within a predetermined size range. It should be noted that, with the materials chosen, there are no particular specificities for the optical window positioned in front of the image sensor. The user places the cover on the optical window before taking the image.

In some embodiments, the sterile cover 29 includes a polarizing filter 29a that is positioned when the smartphone is inserted opposite a light source and a polarizing filter that is positioned opposite the lens.

In the embodiment partially illustrated in FIG. 3, the image capturing means is an endoscope 30.

FIG. 3 shows an endoscope 30, which has an optical tube 32 with optical components (not shown) for carrying an image from an optical window 33 positioned at the distal end of the tube 32, left in FIG. 3, to a connector 36 for a video camera (not shown) or a camera (not shown). The optical components integrated into the optical tube are generally either only optical lenses or optical fibers following at least one image-forming optical lens. The optical window 33 located at the distal end of the optical tube 32 is either the front lens of the optical system integrated into the optical tube 32, or a transparent window positioned upstream of this front lens and protecting it from scratches.

The optical tube 32 is equipped with a light inlet 34 for a lighting system (not shown) and an optical system, such as optical fibers, to carry light from the lighting system to the distal end of the optical tube 32 and illuminate the scene observed by the video camera.

The endoscope 30 can be articulated (flexoscope), i.e. it can accept a variable or rigid curvature (boroscope).

The 32 optical tube is generally 28 to 160 cm long and 5 to 12 mm in diameter. The (cold) light source connected to the light inlet 34 is a high-intensity lamp located outside the unit. The elbow 35 allows the transmission of light from the light entry 34 to the optical tube 32.

The endoscope 30 is inserted into the abdomen through a trocar. A trocar is a surgical instrument in the form of a hollow cylindrical rod with a handle on top. One of the trocars is, in laparoscopy, associated with an endoscope to carry out a visual exploration of the surgical site. Other trocars allow the insertion of surgical tools into the cavity under consideration and the pressurization of the abdominal cavity.

Thus, in embodiments, such as that partially illustrated in FIG. 3, the evaluation device object of the invention also includes a means of introducing into the donor's body at least one optical window of the image capture means, as well as the introduction of a light source to illuminate the donor's liver, while preserving the sterility of the surgical field.

When using the endoscope, the photo is acquired only by the endoscope and not by a smartphone. However:
1) The photo taken by the endoscope can be retrieved via a wired, wireless connection (e. g. according to one of the Bluetooth, or Wi-Fi, trademark protocols) between the endoscope's image retrieval console and a smartphone to send the data to a program implementing the algorithms described below and immediately get the result regarding the steatosis rate.
2) The algorithms can be integrated directly into the image recovery console and can give a real-time result of the steatosis rate on the celioscopy screen (no smartphone is used in this case).

All photos taken with the endoscope are standardized (white balance at the beginning of the operation, identical light and therefore better in terms of quality).

In other embodiments, the image capturing means includes glasses incorporating an electronic sensor.

The image processing means 25 is located either in the image capturing means (for example in the image recovery console or in the smartphone, case not shown), or in a remote server 24 equipped with an image memory 27 and a central unit 26 implementing a mask, determined automatically or fixed. An automatic masking flowchart is described in relation to FIG. 12.

The means of estimating liver health is either in the image capture means or in the remote server 24 equipped with an image memory 27 and a central unit implementing an algorithm detailed below, particularly with respect to FIGS. 4 to 10.

By implementing the device object of the invention, before taking or transplanting the liver, it is assessed whether the liver is healthy enough for the transplantation of the liver to be beneficial to the recipient. The transplant surgeon therefore does not need to travel or perform a purely visual assessment to accept the liver or to have it treated for transplantation. Similarly, for the treatment of obesity, the device provides the surgeon with an immediate estimate of the patient's liver steatosis rate.

Figure 4:
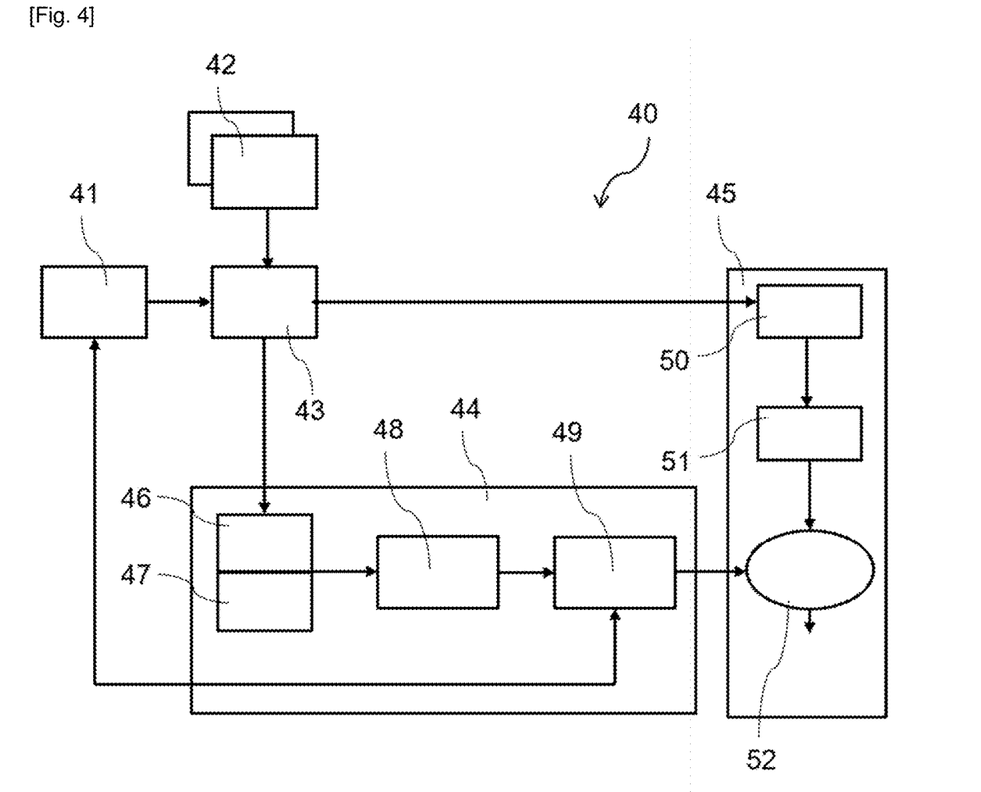
FIG. 4 represents, in the form of a block diagram, functions used for the qualitative evaluation of liver transplants for liver transplants.

In FIG. 4, we observe means implemented in embodiments 40 involving training 44 and health assessment 45. First of all, as shown in the left part, training images 41 previously captured as shown above are processed by image processing means 43 that extracts at least a part of the liver image from each captured image 41. This part of the liver image is in turn processed to form at least one subimage of substantially uniform color (preferably by extracting any subimage of an image representing a reflection, for example a saturation of at least one color, a shadow, for example at least one color being less than a limit value of a few percent of the signal dynamics, a vein, a slit, etc.). In FIG. 4, two sets 46 and 47 of eight image parts, each one, are thus produced. These sets of 46 and 47 subparts are chosen to cover as widely as possible the different colors and/or textures of the image portion of the extracted liver. Equivalently or to achieve this objective, in modes of execution, mean 48 makes a histogram of the colors and/or textures present (except reflections or slit shadows) in the extracted liver image portion or other extraction of image characteristics, as shown below. A specialist, such as a medical laboratory performing biopsies, then gives an assessment of the steatosis rate. Possibly, a specialist, for example a surgeon, gives advice on the ability to transplant the liver and/or degrease it for transplantation and/or on the treatment of obesity to be applied to the patient. A training defining a model 49 is then carried out. This training can be done statistically or with artificial intelligence.

During operation, a liver image 42 captured as described above follows the same image processing steps as above. Each subpart of image 50 is sent to the liver health assessment device. The extraction of characteristics 51 corresponds to the extraction of characteristics 48. Based on the training model 49, the steatosis rate assessment mean 52 provides a value of this rate for the liver considered. Eventually, the assessment tool 52 automatically provides an opinion on the ability to transplant the liver and/or degrease it for transplantation and/or on the treatment of obesity to be applied to the patient.

In the embodiment illustrated in FIG. 4 for the evaluation of HS by grafting, from 40 RGB liver images of 40 different donors, a dataset of patches with size 100×100 is extracted. From each patch, a set of textural features is computed. The dataset is divided in training and testing patches. The features from the training patches are used to train a classifier model. The trained model is used to assess HS from the testing patches.

The trained means for estimating the health of the liver was tested on fifty-four RGB images of livers captured in an operating room. The images were classified in one of three classes:

Class A: $0\% \leq HS \leq 30\%$
Class B: $30\% < HS \leq 50\%$
Class C: $50\% < HS \leq 100\%$ The classifications made by the trained means for estimating the health of the liver were then compared to biopsy results in order to check the results predicted by the trained means for estimating the health of the liver. Out of the fifty-four images classified only one classified in class B whereas the biopsy showed the HS of the liver in the image is between fifty and one hundred percent which corresponds to class C. The trained means for estimating the health of the liver therefore has an error rate of 1.89%.

Figure 15:
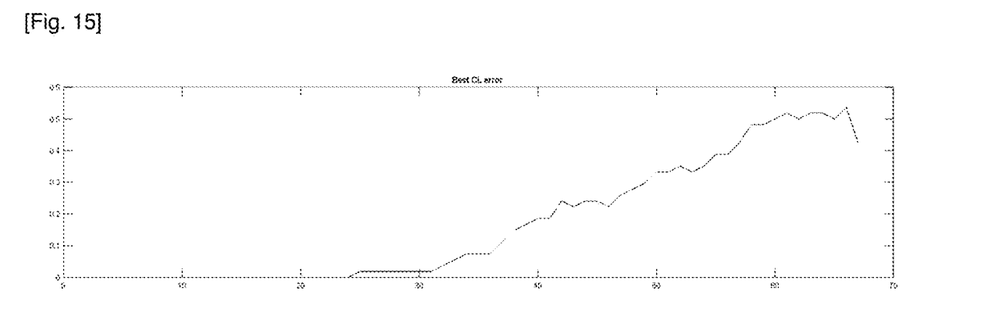
FIG. 15 represents the classification error of a machine learning algorithm subject of the present invention depending on the number of features used in said algorithm and FIG. 16 represents the influence of the number of features on the learning procedure of the machine learning algorithm.
Figure 16:
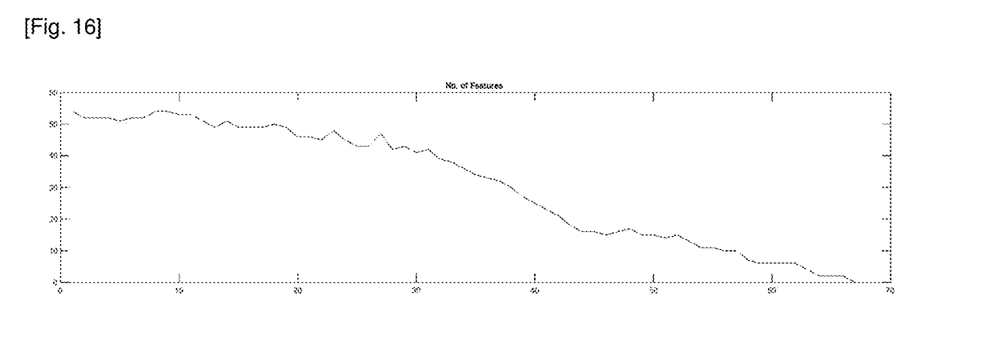

The trained means for estimating the health of the liver used to test the images was trained with thirty-nine variables. FIG. 15 shows the error in classification and FIG. 16 shows the number of features used to obtain the classification in the trained means for estimating the health of the liver. Based on FIGS. 15 and 16, it was possible to deduce that the optimum number of variables to reduce the number of variables while maintaining a low error in classification is thirty-nine.

Figure 5:
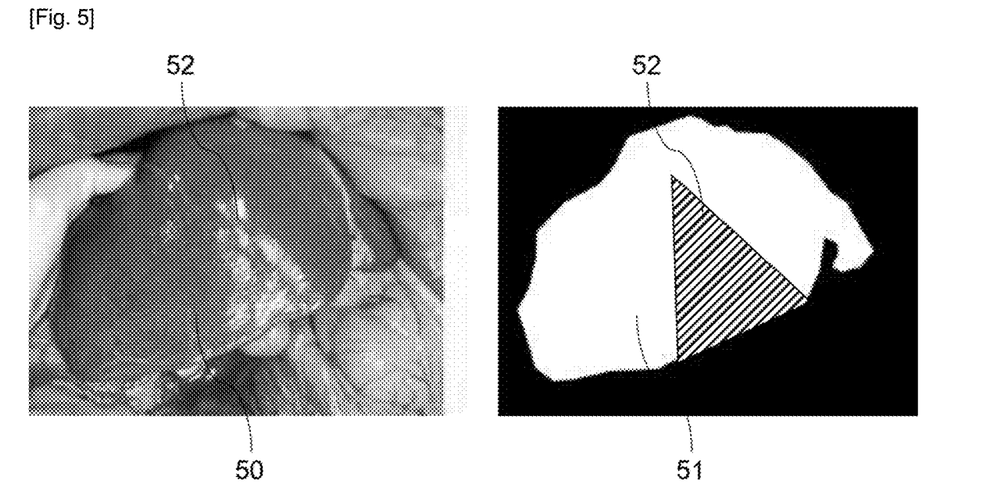
FIG. 5 represents an image of abdominal organs with a liver and a mask for extracting the liver image.

In FIG. 5, on the left, we can see an image of a liver 50, an image with 52 reflections on the surface of this liver. In FIG. 5, on the right, we observe a mask 51 extracting at least part of the image of the liver, preferably comprising a mask 51 of reflections. The constitution of these masks can be predetermined, for example by storing in memory different masks that the user chooses for processing a particular image. The constitution of these masks can also be achieved by automatic or semi-automatic detection of the image portion that represents the liver in an image, for example on the basis of the contours surrounding the central part of the image after extraction of the brightest image portions, which correspond to the reflections.

For the evaluation of steatosis rate according to the characteristics of the subparts of a liver image, its algorithm can be based on a texture analysis based on learning.

Below is a description of a particular embodiment, particularly applied to the analysis of the health of candidate grafts. This embodiment implements automatic liver texture analysis using automatic training algorithms to automate the HS evaluation process and provide support to the surgeon's decision-making process.

For the training, forty RGB images of forty different donors were analyzed. The images were captured with an RGB smartphone camera in the operating room (OR). Twenty images refer to livers that were accepted and 20 to discarded livers. Fifteen randomly selected liver patches were extracted from each image. Patch size was 100×100. This way, a balanced dataset of 600 patches was obtained. Intensity-based features (INT), histogram of local binary pattern ($H_{LBP\ riu2}$), and gray-level co-occurrence matrix ($F_{GLCM}$) were investigated. Blood-sample features (Blo) were included in the analysis, too. Supervised and semi supervised learning approaches were investigated for feature classification. The leave-one-patient-out cross-validation was performed to estimate the classification performance.

With the best-performing feature set ($H_{LBP\ riu2}$+INT+Blo) and semi supervised learning, the achieved classification sensitivity, specificity, and accuracy were 95%, 81%, and 88%, respectively.

This research represents the first attempt to use machine learning and automatic texture analysis of RGB images from ubiquitous smartphone cameras for the task of graft HS assessment. The results suggest that is a promising strategy to develop a fully automatic solution to assist surgeons in HS assessment inside the operating room.

More details on this example of an algorithm that can be used are given below. Liver transplantation (LT) is the treatment of choice for patients with end-stage liver disease for which no alternative therapies are available. Due to increasing demand and shortage in organ supply, expanded donor selection criteria are applied to increase the number of grafts for LT. Since extended criteria donors generates augmented morbidity and mortality in recipient population, liver graft quality assessment is crucial.

Liver texture analysis has the advantage of being performed on standard RGB optical imaging, without requiring additional instrumentations. It is worth noting that modern cellphone cameras provide decent quality images for liver assessment and are ubiquitous.

The proposed approach for extracting and classifying textural entities is explained below. The feature extraction strategy is explained ("Feature extraction" section) as well as the classification model training ("Model training" section). We will explore both supervised ("Supervised" approaches for patch classification" section) and semi supervised ("Semi supervised approach for image classification" section) classification approaches. The evaluation protocol, which includes materials, parameter setting, and performance measure definition, is explained in "Evaluation" section.

Regarding the feature extraction, when choosing the classification features, it is necessary to consider that liver images may be captured under various illumination conditions and from different viewpoints. As a consequence, the features should be robust to the camera pose as well as to the lighting conditions. Furthermore, with a view of a real-time computer-aided application, they should be computationally cheap. LBPs fully meet these requirements.

A rather popular LBP formulation is the uniform rotation-invariant one ($LBP_{r\ i,\ u\ 2}^{R,\ P}$). The $LBP_{r\ i,\ u\ 2}^{R,\ P}$ formulation requires to define, for a pixel $c=(c_x, c_y)$, a spatial circular neighborhood of radius R with P equally spaced neighbor points $\{^P p\}_{p \in (0,\ P-1)}$:

$$LBP_{riu2}^{R,P}(c) = \begin{cases} \sum_{p=0}^{P-1} s(g_{P_p} - g_c), & \text{if } U(LBP^{R,P}) \leq 2 \\ P+1, & \text{otherwise} \end{cases} \quad (1)$$

where $g_c$ and $g_{p\ p}$ denote the gray values of the pixel c and of its pth neighbor $p_p$, respectively. $s(g_{p\ p} - g_c)$ is defined as:

$$s(g_{P_p} - g_c) = \begin{cases} 1, & g_{P_p} \geq g_c \\ 0, & g_{P_p} < g_c \end{cases} \quad (2)$$

and $U(LBP^{R,\ P})$ is defined as:

$$U(LBP^{R,P}) = \\ |s(g_{P_{P-1}} - g_c) - s(g_{pa} - g_c)| + \sum_{p=1}^{P-1} |s(g_{P_p} - g_c) - s(g_{P_{p-1}} - g_c)| \quad (3)$$

Here, the $H_{LBPr\ i\ u2}$, which counts the occurrences of $LBP_{r\ i,\ u\ 2}^{R,\ P}$, was used as textural feature and normalized to the unit length.

To include image intensity information, which has been reported as related to the HS level from the clinical community, we also included intensity-based features (INT), which consisted of image mean and standard deviation, computed for each RGB channel in the image.

For comparison, we also extracted the GLCM matrix-based textural features. The GLCM computes how often pair of pixels (c, q) with specific values and in a specified spatial relationship (defined by θ and d, which are the angle and distance between c and q) occur in an image. In the GLCM formulation, the GLCM width (W) is equal to the GLCM height (H) and corresponds to the number of quantized image intensity gray levels. For the w=h intensity gray level, the GLCM computed with θ and d is defined as:

$$GLCM_{\theta,d}(h, w) = \begin{cases} 1, & I(c) = h \text{ and} \\ & I(c_x + d \cdot \cos(\theta), c_y + d \cdot \sin(\theta)) = w \\ 1, & I(c) = h \text{ and} \\ & I(c_x + d \cdot \cos(\theta), c_y - d \cdot \sin(\theta)) = w \\ 0, & \text{otherwise} \end{cases} \quad (4)$$

We extracted GLCM-based features from the normalized $GLCM_{\theta, d}$, which expresses the probability of gray-level occurrences, is obtained by dividing each entry of the $GLCM_{\theta, d}$ by the sum of all entries. The GLCM feature set ($F_{GLCM}$) consisted of GLCM contrast, correlation, energy and homogeneity.

Since texture is a local image-property, we decided to compute textural features from image patches Below is a description of an approach for the classification of supervised methods.

To perform patch classification, support vector machines (SVM) with the Gaussian kernel ($\psi$) were used. Indeed, SVM allowed overcoming the curse-of-dimensionality that arises analyzing our high-dimensional feature space. The kernel-trick prevented parameter proliferation, lowering computational complexity and limiting over-fitting. Moreover, as the SVM decisions are only determined by the support vectors, SVM are robust to noise in training data. For our binary classification problem, given a training set $T=\{y_t, x_t\}_{t \in T}$, where $x_t$ is the t th input feature vector and $y_t$ is the t th output label, the SVM decision function ($f$), according to the "dual" SVM formulation, takes the form of:

$$f(x) = \text{sign}\left[\sum_{t \in T} a_t^* y_1 \Psi(x, x_t) + b\right] \quad (5)$$

where:

$$\Psi(x,x_t)=\exp\{-\gamma\|x-x_t\|_2^2/\sigma^2\}, \gamma>0 \quad (6)$$

b is a real constant and $a_i$ is computed as follows:

$$a_t^* = \max\left\{-\frac{1}{2}\sum_{k,l=1}^{N} y_t y_l \Psi(x_t, x_1) a_t a_i + \sum_{t \in T} a_t\right\} \quad (7)$$

with:

$$\sum_{t \in T} a_t y_i = 0, 0 \le a_i \le C, t \in T \quad (8)$$

here, $\gamma$ and C were retrieved with grid search and cross-validation on the training set, as explained above.

The semi-supervised approach to image classification is described below.

After performing the patch classification with SVM and RF, we identified the best-performing feature set as the one that guarantees the highest Se. With the best-performing feature set, we further investigated the use of multiple instance learning (MIL), a semi supervised machine learning technique, for performing full image classification (instead of patch classification) from patch-based features. In fact, it is worth noting that the pathologist gold-standard biopsy-based classification is associated to the whole image, and not to the single patch. Thus, considering all patches from an image of a graft with high HS as pathological may influence the classification outcome, as HS is commonly not homogeneous in the hepatic tissue. Therefore, we decided to investigate if MIL can support HS diagnosis from (unlabeled) patches extracted from (labeled) RGB images. Among MIL algorithms, we investigated the use of single instance learning (SIL), which has the strong advantage of allowing the fusion of patch-wise information (such as textural features) with image-wise information (such as blood-sample features), thus providing further information for the classification process. Here, we decided to investigate the popular SVM-SIL formulation, which showed good classification performance in several fields outside the proposed one.

For our semi-supervised binary classification problem, let $Tp \subseteq T$ be the set of positive images (rejected grafts), and $Tn \subseteq T$ the set of negative images (accepted grafts). Let $eTp=\{t \mid t \in T \in Tp\}$ and $eTn=\{t \mid t \in T \in Tn\}$ be the patches from positive and negative images, respectively.

Let $L=Lp+Ln=I\ eTp\ I+I\ eTn\ I$ be the total number of patches.

For any patch $t \in T$ from an image $T \in T$, let xt be the feature vector representation of t.

Thus, $x_T = \Sigma_{t \in T} x_t$ is the feature vector representation of image T. The SVM-SIL optimization, here written in the «primal» SVM formulation for better readability, aims at minimizing J:

$$J(w, b, \xi) = \frac{1}{2}\|w\|^3 + \frac{C}{L}\sum_{X \in X}\sum_{x \in X}\xi_t \quad (9)$$

subject to:

$$wx_t+b \le -1+\xi_t, \forall t \in \tilde{T}_n \quad (10)$$

$$wx_t+b \ge +1-\xi_t, \forall t \in \tilde{T}_p \quad (11)$$

$$\xi_t \ge 0 \quad (12)$$

Where $\xi_t$ is the relaxing term introduced for the soft-margin SVM formulation, b is a real value, w the SVM weight vector. Also in this case, C was retrieved with grid search and cross-validation on the training set, as explained in "Evaluation" section. As SIL allows fusing patch-wise (i.e., texture features) and image-wise (i.e., blood features) features, in addition to the best-performing feature set, features from blood tests (Blo) were used, too. In particular, alanine aminotransferase, aspartate aminotransferase, bilirubin, liver Hounsfield unit (HU), difference between the liver and the spleen HU, and gamma glutamyl transferase were considered. Further, patient' age, weight and height were also considered. Thus, Blo feature size was 9. The Blo features are commonly used for HS assessment by surgeons, as introduced in "Introduction". Thus, their use would not after the actual clinical practice.

Figure 6:
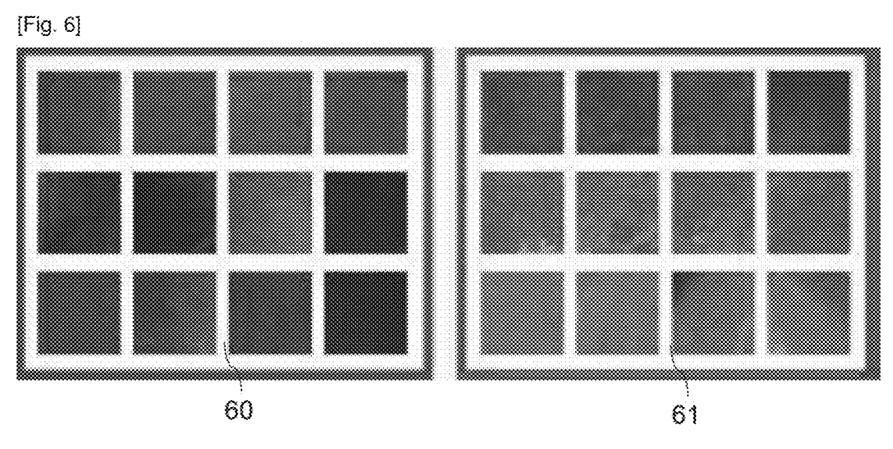
FIG. 6 represents image extracts for sampling a data set.

FIG. 6 shows subparts 60 (liver accepted) and 61 (liver refused) of sampling images from the data set. Each row refers to subparts extracted from the same image of the same liver.

Biopsy was performed during procurement, taking surgical triangular hepatic samples up to 2 cm. One pathologist analyzed the histological sections. Steatosis was visually assessed based on the percentage of hepatocytes with intracellular large lipid droplets by using a semi-continuous scale [0%:5%:100%]. From the dataset, 20 livers referred to discarded grafts, as with a HS≥60%. The remaining 20 livers had a HS≤20% and were transplanted. Images were acquired with a smartphone RGB camera. Image size was 1920×1072 pixels. All the images were acquired with open-surgery view, as no laparoscopic procurement is performed for cadaveric donors. Challenges associated with the dataset included:

Wide range of illumination
Varying camera pose
Presence of specular reactions
Different organ position Visual samples of liver images are shown in FIG. 5. From each image, liver manual segmentation was performed to separate the hepatic tissue from the back-ground. The liver contour in each image was manually drawn or automatically detected by marking seed points along the lived edges, which were then connected with straight lines by the software. The whole image was then divided in non-overlapping patches of size 100×100 pixels starting from the top-left image corner. We chose such patch size as image-patch size is usually of the order of magnitude of $10^2 \times 10^2$ pixels. The rightest part of the image, for which it was not possible to select full patches, was discarded. This did not represent a problem since the liver was always displayed at the center of the image. A patch was considered valid for our analysis if it overlapped with at least 90% of the liver mask. To have the same number of patches from each patient, we first computed the minimum number of image patches that we could obtain among all images, which was 15. Then, we randomly extracted 15 patches from all the other images. As result, our patch dataset was composed of 300 patches extracted from transplanted liver and 300 from non-transplanted ones. Sample patches for transplanted and non-transplanted livers are shown in FIG. 5. For the feature extraction described in "Feature extraction" Section, the $LBP_R^{r\ i}, _P^{u\ 2}$ were computed with the following (R; P) combinations: (1; 8), (2; 16), (3; 24), and the corresponding $H_{LBP_{r\ i\ u2}}$ were concatenated. Such choice allows a multi-scale, and therefore a more accurate description of the texture. The $LBP_R^{r\ i}, _P^{u\ 2}$ were computed for each RGB image channel. Nine $GLCM_{\theta,d}$ were computed for each RGB channel using all the possible combinations of $(\theta, d)$, with $\theta \in \{0°, 45°, 90°\}$ and $d \in \{1, 2, 3\}$, and the corresponding FGLCM sets were concatenated. The chosen interval of $\theta$ allows to approximate rotation invariance, as suggested in 10. The values of d were chosen to be consistent with the scale used to compute $LBP_R^{r\ i}, _P^{u\ 2}$.

Prior to classification, we also investigated feature reduction by means of principal component analysis (PCA). In particular, we applied PCA on our best-performing (highest Se) feature set. We then retained the first principal components with explained variance equal to 98% and performed the classification described in "Supervised approaches for patch classification" section.

For performing the classification presented in "Model training" section, the SVM hyper-parameters, for both the supervised and semi supervised approaches, were retrieved via grid search and cross-validation on the training set. The grid search space for $\gamma$ and C was set to $[10^{-10}, 10^{-1}]$ and $[10^0, 10^{10}]$, respectively, with 10 values spaced evenly on $\log_{10}$ scale in both cases. The number of trees for RF training was retrieved with a grid search space set to [40,100] with six values spaced evenly.

The feature extraction and classification were implemented with scikit-image[1] and scikit-learn.[2]

We evaluated the classification performance of SVM, RF and SVM-SIL using leave-one-patient-out cross-validation. Each time, the patches extracted from one patient were used for testing the performance of the classification model (SVM, RF or SVM-SIL) trained with (only) the images of all the remaining patients. The separation at patient level was necessary to prevent data leakage.

To evaluate the classification performance, we computed the classification (Se), specificity (Sp), and accuracy (Acc), where:

$$Se = \frac{TP}{TP + FN} \quad (13)$$

$$Sp = \frac{TN}{TN + FP} \quad (14)$$

$$Acc = \frac{TP + TN}{TN + FP + TP + FN} \quad (15)$$

being TP, TN, FP and FN the number of true positive, true negative, false positive and false negative, respectively.

We used the Wilcoxon signed-rank test (significance level $\alpha=0.05$) for paired sample to assess whether the classification achieved with our best-performing (highest Se) feature vector significantly differs from the ones achieved with the other feature sets in Table 1.

TABLE 1

Tested feature vectors for the supervised patch classification with support vector machines and random forest and the corresponding number of features.

| Feature vector | INT | FGLCM | HLBP | HLBP + INT |
|---|---|---|---|---|
| Number of features | 6 | 108 | 162 | 168 |

INT: Intensity mean and variance. FGLCM: Gray-level co-occurrences matrix-based descriptors; HLBP: Normalized histogram of rotation-invariant uniform local binary models.
It should be noted that the rating "+" in the tables means "considered together".

TABLE 2

Area under the recieving operating characteristic curve (ROC) obtained with support vector machines (SVM) and different feature vectors.

|  | ROC |
|---|---|
| INT | 0.65 |
| FGLCM | 0.71 |
| HLBP + INT | 0.76 |
| HLBP | 0.77 |

INT: Intensity mean and variance; HLBP: Normalized histogram of rotation-invariant uniform local binary models.

TABLE 3

Patch-classification performance measure obtained with support vector machines (SVM) and different feature vectors.

|  | Se | Sp | Acc |
|---|---|---|---|
| INT | 0.58 | 0.80 | 0.69 |
| FGLCM | 0.73 | 0.73 | 0.66 |
| HLB + INT | 0.80 | 0.64 | 0.72 |
| HLBP | 0.82 | 0.64 | 0.73 |

INT: Intensity mean and variance; HLBP: Normalized histogram of rotation-invariant uniform local binary models; Se: sensitivity; Sp: specificity; Acc: precision.

TABLE 4

Patch-classification performance measure obtained by using the histogram of rotation-invariant local binary patterns as a feature with different classifiers. Classification with reduced characteristics is also reported.

|  | Se | Sp | Acc |
|---|---|---|---|
| SVM + PCA | 0.83 | 0.62 | 0.73 |
| RF | 0.72 | 0.61 | 0.67 |
| SVM | 0.82 | 0.64 | 0.73 |

Se: sensitivity; Sp: specificity; Acc = precision; PCA: Principal component analysis; SVM: support vector machines; RF = Random forest.

Table 2 shows the area under the ROC for the SVM classification obtained with the feature vectors in Table 1.

Figure 7:
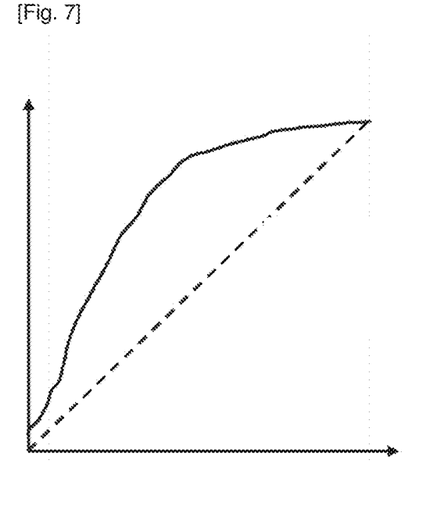
FIG. 7 represents an ROC curve.

The higher area under the ROC (0.77) was obtained with $H_{LBPr\ i\ u2}$. The relative ROC curve is shown in FIG. 7.

The classification performance obtained with SVM and INT, $F_{GLCM}$, $^H LBP_{r\ i\ u2}$ and $^H LBP_{r\ i\ u2}$+INT are shown in Table 3. The best performance was obtained with $H_{LBPr\ i\ u2}$, with Se=0.82, Sp=0.64 and Acc=0.73. Using only INT features led to the worst classification performance for rejected grafts with Se=0.58. Significant differences were found when comparing our best-performing feature ($H_{LBPr\ i\ u2}$) with INT and $F_{GLCM}$. The confusion matrices for feature comparison are reported in FIG. 8.

When exploiting PCA-based feature reduction for $H_{LBPr\ i\ u2}$, Se=0.83, Sp=0.62, and Acc=0.73 were obtained (Table 4). No significant differences with respect to the case without feature selection were found, and therefore we decided to avoid using PCA to keep the overall algorithm computational cost low. Similar results were achieved also with $^H LBP_{r\ i\ u2}$+INT.

Figure 8:
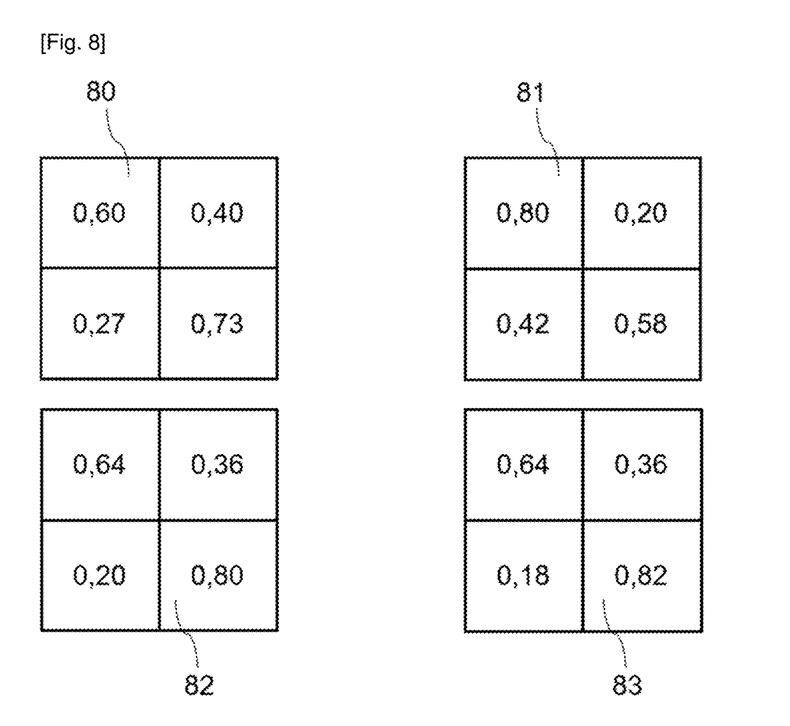
FIG. 8 represents confusing matrices for the comparison of characteristics.
Figure 9:
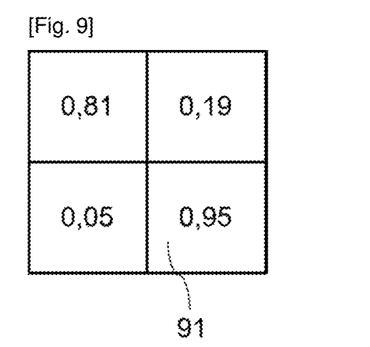
FIG. 9 represents a matrix of confusion for a classification.

When classifying $H_{LBPr\ i\ u2}$ with RF, Se=0.72, Sp=0.61, and Acc=0.67 were obtained (Table 4). Significant differences with respect to SVM performance were not found. The visual confusion matrices 80, 81, 82 and 83 for the patch classification performed with SVM and $H_{LBPr\ i\ u2}$ is shown in FIG. 8.

From our patch-based experimental analysis, among all the tested feature sets, $H_{LBP}$+INT and $H_{LBP}$ were the best-performing feature sets. Thus, we decided to test SVM-SIL with these two feature vectors, including also the Blo features as introduced in "Semi supervised approach for image classification" section. The features investigated for SVM-SIL classification and the correspondent number of features are reported in Table 5. With SVM-SIL, $H_{LBP}$+INT+Blo showed the best classification performance, with Se=0.95, Sp=0.81, and Acc=0.88. When using $H_{LBP}$+Blo, Acc=0.82 was achieved. The confusion matrix 91 for the SVM-SIL classification for $H_{LBP}$+INT+Bio is reported in FIG. 9. It is worth noting that SVM-SIL failed in classifying images of rejected liver grafts only once.

As for the algorithm computational cost, the liver manual segmentation took ~3 s on average per image. The classification process (both for SVM, RF and SVM-SIL) took ~$10^{-5}$ s. The time for the computation of $H_{LBP}$+INT for one patch was ~0.02 s.

TABLE 5

Tested feature vectors for semi-supervised image classification with single instance learning - support vector machines and corresponding number of features.

| Feature vector | HLBP + INT | HLBP + INT + Blo |
|---|---|---|
| Number of features | 168 | 177 |

INT: Intensity mean and variance; HLBP: Normalized histogram of rotation-invariant uniform local binary models, Blo: blood features.

In this embodiment, the computer-aided evaluation of HS in RGB images acquired with smartphones in the operating room exploits the analysis of liver texture associated with automatic learning. With respect to the approaches in the literature, our method only requires RGB images and blood-sample tests. Moreover it provides the surgeons with a classification outcome on whether to accept or discard a liver graft. For our experimental analysis, the highest (supervised) patch classification performance was obtained with $H_{LBPr\ i\ u2}$ and $H_{LBPr\ i\ u2}$+INT, which performed equally. $F_{GLCM}$ per-formed worse and this is probably due to the GLCM lack of robustness to illumination condition changes. In fact, when acquiring liver images, no assumption on keeping the illumination constant was done, resulting in different levels of illumination in the images. Similarly, also INT features were not able to face such variability in the illumination.

Classification performance with and without PCA did not differ significantly. Therefore, we decided to avoid performing PCA feature reduction for lowering the algorithm computational cost with a view to real-time applications.

SVM-SIL provided a more reliable and robust classification with respect to supervised approaches, both in terms of Se and Sp. In fact, SVM-SIL misclassified a rejected liver image only once. This can be attributed to the fact that SIL did not make any assumption on ground-truth patch labels, but only exploited the ground-truth classification of the images obtained through histopathology for training purposes. The inclusion of blood-test features helped increasing the classification accuracy with respect to using only textural features. Nonetheless, it is worth noting that Blo alone was not sufficient to achieve accurate HS diagnosis. Indeed, during our preliminary analysis, we achieved an Acc=0.75 with supervised SVM-based classification when considering Blo alone. This supports the hypothesis that textural-information inclusion is a valid support for HS diagnosis.

The computational time required by the proposed method was not compatible with real-time application due to the computational cost associated with the liver manual segmentation. To reduce the computational cost and make the process more automatic, color thresholding could be used to segment the liver.

Nevertheless, in these embodiments we decided to perform manual liver masking to keep the experimental setup as controlled as possible with the goal of investigating the potentiality of machine learning in the analyzed context. In other embodiments, the masking is automatic.

Figure 10:
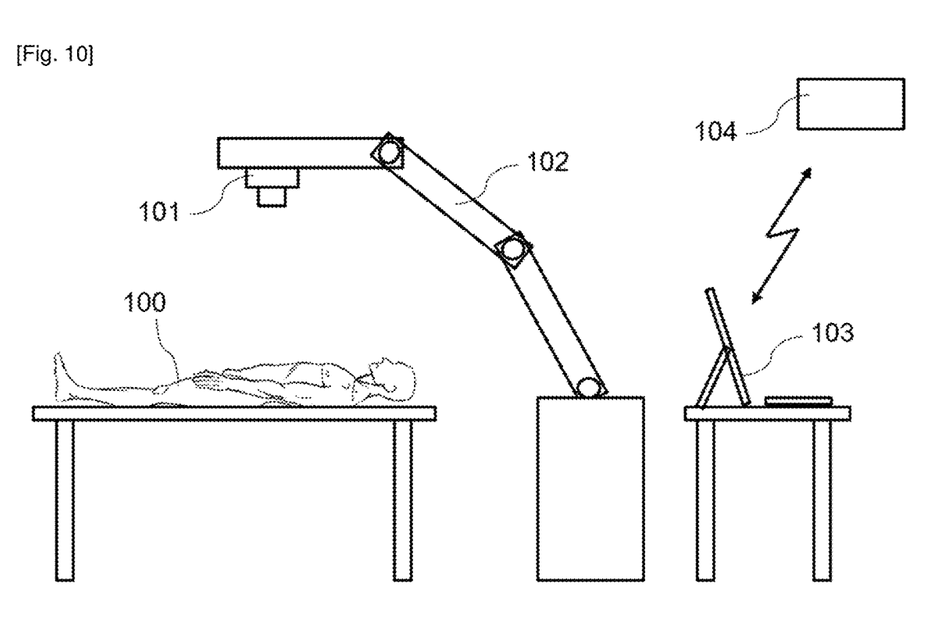
FIG. 10 represents, schematically, a particular embodiment of the device that is the subject of the invention.

In FIG. 10, we observe a patient, or donor 100, positioned under an image capturing means 101 supported by an articulated arm 102. A computer 103 receives the images captured by the sensor 101 and performs the processing described above, possibly sharing with a remote server 104 with which the computer 103 is in communication.

It should be noted that virtual reality glasses can be used to assist an operator or surgeon during image capture and processing.

FIG. 11 shows the following sequence of 110 processing steps:
- a step 111 of inserting a moving image sensor, including a smartphone, into a sterile cover with a transparent window,
- a 112 step of opening an application and connecting to a server,
- an image capturing step 113, for example using a flash source and possibly a color chart to normalize the image signal,
- a step of extracting 114 at least part of an image from the liver, for example by manual, semi-automatic or automatic masking, preferably by removing reflections and/or shadows,
- a step 115 of creating a directory for the patient or donor under consideration and inserting identification and biological data into this directory,
- a step 116 of transmitting the extracted image to a remote server,
- a step 117 of segmentation of the image into image subparts,
- a step 118 of classifying all subparts of images to estimate a steatosis rate, a step 119 of comparing the steatosis rate with at least one predetermined limit value to decide on the treatment to be applied to the livers, in particular, in the case of a planned transplantation, to decide whether the liver is transplantable as such, must be defatted or is not transplantable, a step 120 of receiving and storing the results and, if necessary, at least part of the image in the patient's or donors directory and one step 121 of removing the sterile cover.

Below is a description of an algorithm and method for automatic liver segmentation by image acquisition.

The aim is to present a deep learning solution for graft segmentation based on images of acquisition systems acquired in the operating room.

Simulations were performed on three hundred and thirty four RGB images from different donors and the Dice similarity coefficient was 0.9668, the Recall 0.9685 and the accuracy 0.9793. The proposed method aims at a fully automatic solution to help surgeons in the operating room.

The approach based on texture analysis using support vector machine (SVM) to diagnose steatosis, working with RGB images obtained in the operating room, was presented above. This method, although it appears to have promising results, is limited in terms of the requirement for manual identification of the liver contour in the image.

The reference test for identifying the contours of an organ is manual segmentation, but it is not adequate because it depends on the operator and is inappropriate in a particular context such as the operating theatre because of the requirement for operator intervention. In addition, the use of large quantities of images can be a long and tedious process. One of the strategies of deep learning that involves certain convolutional filters that can learn data characteristics hierarchically. The role of filters is to extract certain characteristics from input photos and collect them in a map, which includes these features. The number of filters for each nucleus is chosen according to the time required to form the network and the complexity of the problem; in general, a larger number of filters will give better results. This rule is only applied up to a certain threshold because, above this threshold, an increase in the number of filters will not give more performance.

Below, we present a method of automatic segmentation of RGB images taken in the operating room with a smartphone camera.

Figure 12:
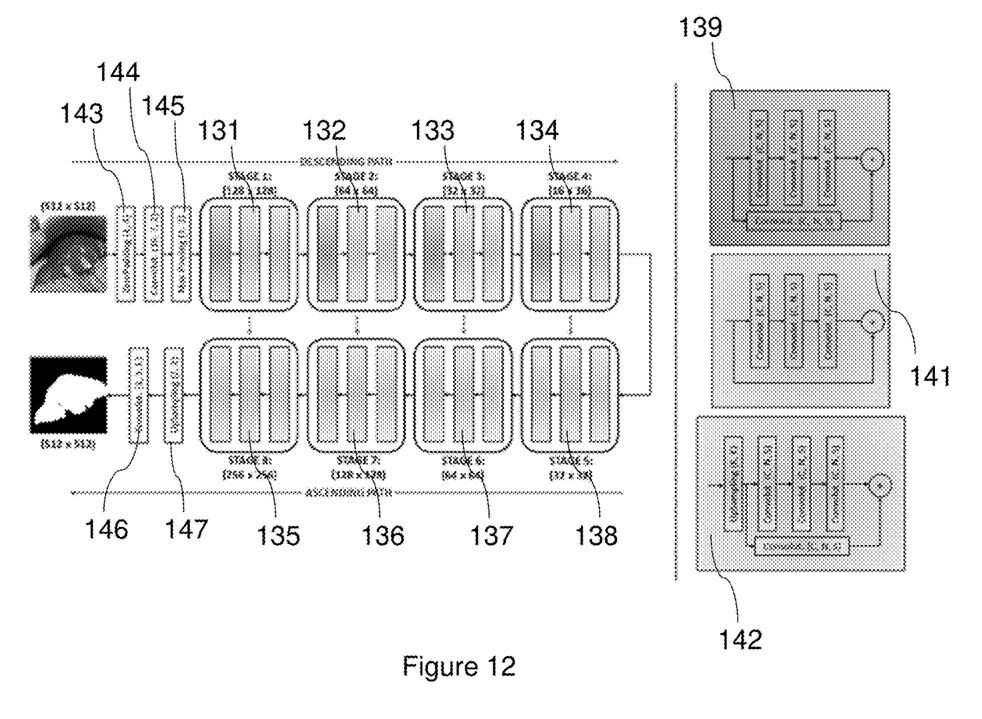
FIG. 12 is a schematic of a fully convolutional neural network.

In particular embodiments, a fully convolutional neural network ("FCNN") is used. It is composed of several nuclei and layers as shown in FIG. 12. In this case, the network model consists of a convolutional (top-down) network and a bottom-up convolutional network. The convolutional neural path begins to perform a zero fill (4, 4) add four rows and four columns of zeros at the top, bottom, left and right of the image table. Then, the FCNN continues with the convolutional neural path conducted with sixteen (7×7) filters, followed by batch normalization, rectified linear filter, unit activation (ReLU) and pooling (3, 3) with steps (2, 2). After these layers, the downward path continues with a convolutional block composed of three convolutional cascade filters and a shortcut connection with 1×1 convolution. The convolutional block is followed by two convolutional identity blocks, composed of three convolutional nuclei in cascade and an identity shortcut connection. The combination of one convolutional block and two convolutional identity blocks is repeated four times (FIG. 12: from step 131 to step 134). At each step, the number of convolutional filters per layer is doubled. The path of the ascending convolutional network is symmetrical to that of the descending convolution. Each step, repeated four times (In FIG. 12: from step 135 to step 138), presents a block of upward conversion in the convolutional network. The ascending path ends with a resampling block of size (2, 2) and a convolutional block, this case with a filter (3×3) and a sigmoid activation.

FIG. 12 is a schematic of the fully convolutional neural network. On the left, the entire path can be divided into two parts: the descending path 130 (top) and the ascending path 140 (bottom), each composed of four steps. Each step of the descending path consists of a convolutional block (boxes on the left) and two identification blocks (boxes in the center and right), while in the ascending path, there is an upward conversion block (boxes on the right) and two identification blocks (in the center and left).

The "ZeroPadding" block (or margin at "0") 143 represents a zero fill layer (P, P), with a fill P×P. The "Convolut." block 144 or 146 represents a convolutional layer (C, N, S), with C channels, nucleus size N×N and stride S. Each convolutional layer is followed by a batch normalization layer and an activation function ReLU. The "Max Pooling" block 145 indicates a maximum pooling operation (N, S) on N×N patches and with stride S. The "UpSampling" function 147 indicates an oversampling operation (K×K) of size K. The vertical arrows in discontinuous lines indicate the concatenation of the map of characteristics from the convolutional path down to the ascending path. On the right, in 139, 141 and 142, is an example of convolutional blocks, identification and upward conversion.

Figure 13:
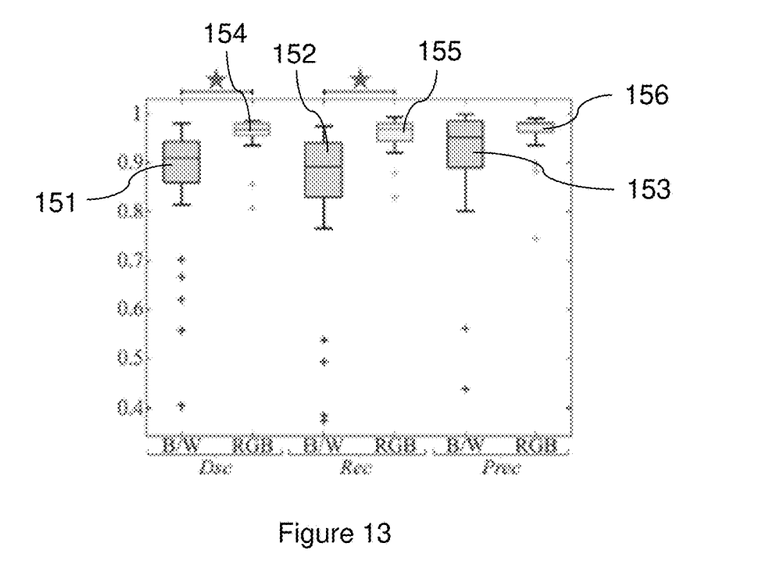
FIG. 13 represents a graph of similarity coefficients.

FIG. 13 is a Boxplot (or "moustache box") of the similarity coefficients of Dice (Dsc), Recall (Rec) and precision (Prec) for grey levels (boxplots 151 to 153) and RGB images (boxplots 154 to 156). The stars indicate significant differences between the results obtained with RGB or grayscale images.

Regarding training (or learning), Adam (adaptive momentum estimation) optimizer (trademark) was used to form the proposed FCNN network. Adam estimated the first moment $\hat{m}_t$ and the second moment $\hat{v}\_t$ of the loss function gradient to update a $\theta$ network parameter after t mini-lots:

$$\theta_t = \theta_{t-1} - \frac{\alpha}{\sqrt{\hat{u}_t(g_t)} + \varepsilon} \cdot \hat{m}_t(g_t) \tag{1}$$

where a is the step, gt is the gradient with respect to the parameter e after t mini-lots and E is a small number. The cost function used in our simulation is the Dice similarity coefficient where TP is the number of true positives, FN the number of false negatives and FP the number of false positives. These terms are obtained from pixels.

In the table below, the medians of the similarity coefficients of Dice (Dsc), recall (Rec) and Precision (Prec) obtained for grayscale and RGB images. Interquartile ranges are indicated in brackets.

TABLE 6

|  | Dsc | Rec | Prec |
|---|---|---|---|
| Grayscale | 0.9102 (0.0835) | 0.8919 (0.1104) | 0.9516 (0.0956) |
| RGB | 0.9668 (0.0234) | 0.9685 (0.0350) | 0.9793 (0.0191) |

$$Dsc = \frac{2 \times TP}{FN + FP + 2 \times TP} \tag{2}$$

Figure 14:
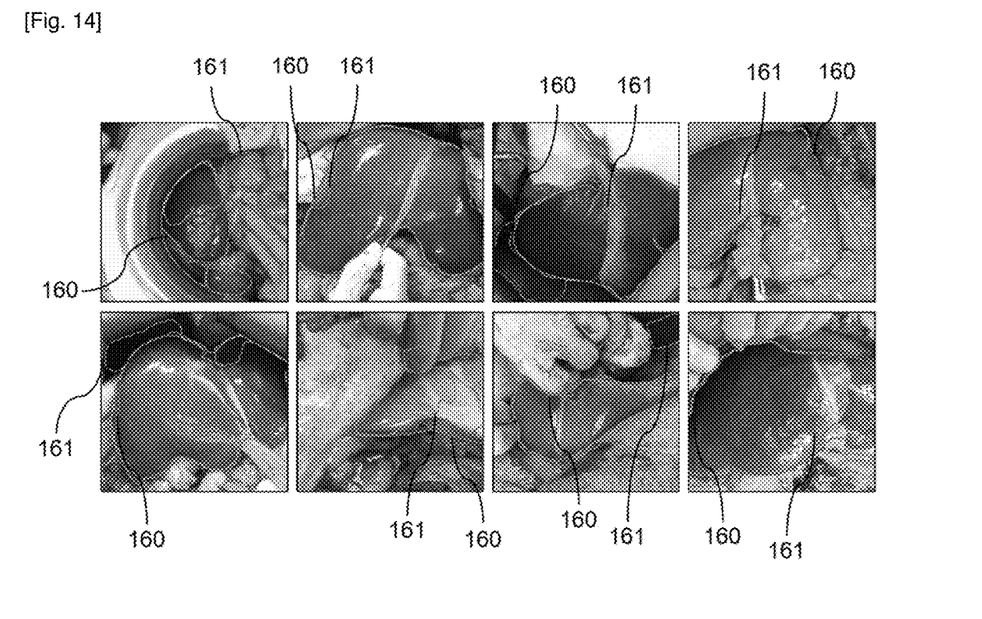
FIG. 14 represents examples of segmentation results in the form of photographs.

FIG. 14 shows examples of segmentation results. Lines 161 and 160 refer to the original grayscale mask and the mask of the original RGB image respectively.

The best analysis model was chosen on the validation Dsc, and it was monitored during training. Two simulations were performed: in the first, the FCNN was trained with RGB photos and the second with grayscale images, obtained by converting the original photos. The main difference is in the pre-treatment phase and are related to the dimensions of the photos where the liver images are recorded. In particular, they differ in the number of channels.

Concerning the experimental protocol, three hundred and thirty-four RGB photos of different donors were used. The image size was 1632*1224 pixels. The images were captured with the camera of an RGB smartphone (12 megapixels) intraoperatively. For each image, a manual liver segmentation was performed to separate the liver from the background of the photo. In this way, segmentation was obtained by manually tracing the contours of the liver.

The dataset for training consisted of three hundred photos and three hundred corresponding manual liver masks. The dataset (validation cohort) consisted of thirty-four different images. In the first simulation, we used RGB images, while in the second, the same images were converted to grayscale. For the first simulation, in the section on data set preparation, pre-processing of images and masks was performed to obtain an RGB image table, where each image had three channels and a mask table with one channel. On the other hand, for the second simulation, pre-processing was simpler and the grayscale images and masks were constructed as tables with a single channel.

In this section, the masks and images have been cropped to reduce their dimensions to 1224×1224 to make them square. Subsequently, the images were resized successively in 512×512, to reduce the computing power and memory required, the proportions were maintained and the images were not distorted.

Then we trained the FCNN, initially with a batch size of 15 out of 100 iterations and a learning rate of 10^(−2), then 100 more iterations with a batch of 15 and a learning rate less than 3×10^(−5). A higher learning rate was useful to accelerate convergence since a lower value ensures that we have not missed the minimum necessary performance. The 40% of the training images were used as a validation test.

The results of the automatic segmentation are compared to those of the manual segmentation, the gold standard. To evaluate the segmentation performance of the FCNN proposal we calculated the Dsc, Recall (Rec) and accuracy (Prec) of the masks predicted on MATLAB (trademark):

$$Rec = \frac{TP}{TP + FN}$$
$$Prec = \frac{TP}{TP + FP}$$

Where TP, FN and FP are already defined. For training, the Wilcoxon rank sum test (significance level equal to 5%) for medians is used to assess whether there are statistical differences between the predicted mask based on the RGB segmentation of images and the segmentation of images in grey levels. All experiments are carried out on Google Colaboratory (registered trademarks). On the other hand, manual liver segmentations and statistical analysis were performed on MATLAB.

Regarding the results, a significant difference was found by comparing the Dsc and Rec calculated on predictive masks derived from RGB images and predictive masks derived from grey levels. On the other hand, no significant difference could be assessed on the Prec. In particular, the medians and interquartiles of Dsc, Rec and Prec for the predicted masks were deduced from the simulation with RGB images by over-performing the simulation with grey levels, as shown in the last table above. The results, presented in the boxplots in FIG. 13, were statistically validated with the Wilcoxon test. FIG. 14 shows a sample of the segmentation results where it is possible to compare predictive masks, derived from grayscale and RGB images with manual masks.

In the last table, it is possible to see the results obtained with automatic segmentation using RGB images compared to automatic segmentation using grey scale images, in terms of Dsc, Rec and Prec. In particular, Prec's results do not show any significant difference, based on the sum of Wilcoxon's ranks (significant level $\alpha$ equal to 5%), as shown in FIG. 13. The Prec medians for grayscale and RGB images are 0.9516 and 0.9793 respectively. On the other hand, the results of Dsc and Rec show significantly different results. The medians Dsc for grayscale and RGB images are 0.9102 and 0.9668 respectively. In contrast, the Rec medians of grayscale and RGB images are 0.8919 and 0.9685 respectively.

The use of grayscale images simplifies the model by improving clinically, but the significant differences in statistical analysis suggest that better results can be achieved by using RGB images.

We observe that the worst predictions are made when the portion of liver is small in the original image. Another aspect that could affect predictions is the absence of a clear and distinct distinction between the liver and surrounding tissues. An example of poor hepatic mask prediction is shown in the sample at the top left of FIG. 14.

The device subject of the invention described above and the particular embodiments of said device can also be used on a pancreas.

What is claimed is:

1. A device for the qualitative evaluation of a liver, comprising:

a camera for capturing light in the visible spectrum reflected from a visually exposed liver, said camera is configured to obtain an image of said liver by color photography or color videorecording, the liver being visually exposed in a donor's body or already collected or placed in a hypothermic, normothermic and/or sub-normothermic graft perfusion machine at the time of image capture;

a sterile cover configured to contain the camera as well as a light source for illuminating the donor's organ, while maintaining the sterility of the surgical field, said sterile cover including a transparent image capture window to be positioned in front of a lens of the camera:

an image processor configured for applying a trimming mask to the captured image, said trimming mask comprising a trimming portion corresponding to the brightest image portions, which correspond to reflections of the light emitted by the light source on the liver, to obtain a trimmed image, said image processor is further configured to extract at least a portion of the liver's image from the trimmed image and to determine at least the color of the liver; and, means for estimating, from the extracted image, the steatosis rate of the liver based at least on the color of the liver.

2. A device according to claim 1, wherein said image processing is configured to generate the trimming mask by processing the colors and/or contours in the captured image.

3. A device according to claim 1, wherein the image processor is configured to detect at least one reflection on the surface of the liver in the captured image and to extract from the image at least one area having such reflection.

4. A device according to claim 1, wherein the image processor is configured for making a color histogram and comparing at least one color of said histogram with a standardized color.

5. A device according to claim 4, wherein each standardized color is carried by a color chart introduced into the field of the captured image.

6. A device according to claim 1, wherein the image processor is configured for performing texture sampling and comparing at least one texture with a reference texture.

7. A device according to claim 1, wherein the camera for capturing an image is a mobile phone.

8. A device according to claim 1, wherein the camera for capturing an image includes a flash light source and is configured to capture an image with triggering of the light source.

9. A device according to claim 1, wherein the sterile cover comprises a first polarizing filter to be positioned opposite a light source and a second polarizing filter to be positioned opposite the lens of the camera.

* * * * *